United States Patent
Tabata et al.

(10) Patent No.: US 12,463,415 B2
(45) Date of Patent: Nov. 4, 2025

(54) POWER CUTOFF DEVICE, POWER CUTOFF SYSTEM EQUIPPED WITH SAME, METHOD FOR PROTECTING POWER CUTOFF DEVICE, AND PROTECTION PROGRAM

(71) Applicant: OMRON CORPORATION, Kyoto (JP)

(72) Inventors: Kenichi Tabata, Kyoto (JP); Daiki Ando, Kyoto (JP); Hidetoshi Yugen, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 192 days.

(21) Appl. No.: 18/491,058

(22) Filed: Oct. 20, 2023

(65) Prior Publication Data
US 2024/0178654 A1    May 30, 2024

(30) Foreign Application Priority Data
Nov. 29, 2022    (JP) ................. 2022-189855

(51) Int. Cl.
   *H02H 5/04*      (2006.01)
   *G01R 31/327*    (2006.01)
   *H02J 3/14*      (2006.01)

(52) U.S. Cl.
   CPC .......... *H02H 5/04* (2013.01); *G01R 31/3278* (2013.01); *H02J 3/14* (2013.01)

(58) Field of Classification Search
   CPC .......... H02H 5/04; H02H 5/042; H02H 5/043; H02H 6/00; H02H 6/005; H01H 2047/025; H01H 47/002; G01R 31/3278
   See application file for complete search history.

(56) References Cited

U.S. PATENT DOCUMENTS

| | | | |
|---|---|---|---|
| 2015/0200068 A1* | 7/2015 | Kinoshita | H01H 47/22 361/170 |
| 2017/0222428 A1* | 8/2017 | Choi | H01H 47/325 |
| 2018/0212415 A1* | 7/2018 | Dang | G01R 31/2825 |
| 2019/0080858 A1* | 3/2019 | Krause | G08B 21/187 |
| 2022/0131378 A1 | 4/2022 | Pan et al. | |
| 2025/0104947 A1* | 3/2025 | Jackson | H01H 47/002 |

FOREIGN PATENT DOCUMENTS

JP      2022-68855 A    5/2022

* cited by examiner

*Primary Examiner* — Thienvu V Tran
*Assistant Examiner* — Christopher J Clark
(74) *Attorney, Agent, or Firm* — METROLEX IP LAW GROUP, PLLC; Robert L. Scott, Esq.

(57) ABSTRACT

A power cutoff device (20) comprises a power relay (21), a temperature calculation unit (22a), and a determination unit (22b). The power relay (21) includes a drive coil (21a). The temperature calculation unit (22a) calculates the temperature of the drive coil (21a) by calculating the resistance value of a resistor that changes with temperature when the drive coil (21a) included in the power relay (21) is regarded as a resistor. The determination unit (22b) determines whether or not to cut off the power supply on the basis of the temperature of the drive coil (21a) calculated by the temperature calculation unit (22a).

13 Claims, 7 Drawing Sheets

POWER CUTOFF DEVICE, POWER CUTOFF SYSTEM EQUIPPED WITH SAME, METHOD FOR PROTECTING POWER CUTOFF DEVICE, AND PROTECTION PROGRAM

CROSS-REFERENCE TO RELATED APPLICATIONS

THIS APPLICATION CLAIMS PRIORITY TO JAPANESE PATENT APPLICATION NO. 2022-189855 FILED ON NOV. 29, 2022. THE ENTIRE DISCLOSURE OF JAPANESE PATENT APPLICATION NO. 2022-189855 IS HEREBY INCORPORATED HEREIN BY REFERENCE.

BACKGROUND

Technical Field

The present invention relates to a power cutoff device including a relay, and to a power cutoff system comprising the same, and a method for protecting a power cutoff device and a protection program.

Description of the Related Art

Devices and systems that monitor the temperature increase in relays and other such electrical devices and determine whether or not to stop their operation according to whether or not an abnormality has occurred have been used in recent years.

For example, Patent Literature 1 discloses a method that is executed by an electrical plug-in connection device and a management server in order to provide a specific location monitoring method that ensures user privacy, the method including: (A) a step of using a management server to derive behavioral features of an electrical device and construct a behavioral feature identification model; (B) a step of using an electrical plug-in connection device to generate event data for the electrical device and transmitting the event data to the management server; (C) a step of using the management server to determine whether or not the event data matches a plurality of behavioral features in a behavioral feature identification model; and (D) a step of using the management server to send a warning message to a user terminal device associated with the user when the management server determines that there is no match.

CITATION LIST

Patent Literature

Patent Literature 1: JP-A 2022-68855

SUMMARY

Problem to be Solved by the Invention

However, the following problems are encountered with the above-mentioned conventional specific location monitoring method.

Namely, with the specific location monitoring method disclosed in the above publication, a temperature measurement module is provided to measure the temperature of the electrical device, and it is determined whether or not an event (abnormality) has occurred in the electrical device on the basis of the temperature measurement result and the current measurement result.

With this configuration, when an abnormal increase in the ambient temperature of a relay or other such electric device is detected and the operation is halted, it is necessary to set an allowable range that is on the conservative side and determine whether to stop the operation. Also, it is difficult to remotely determine whether the abnormal increase in temperature has been resolved and the device can be restored to operation the operation of the electrical device has been stopped due to an abnormal increase in ambient temperature, so this necessitates that work be carried out directly at the site.

It is an object of the present invention to provide a power cutoff device with which the function of protecting a power cutoff device including a relay can be improved without having to use a separate temperature sensor or the like to sense the temperature, as well as a power cutoff system comprising this power cutoff device, and a method of protecting a power cutoff device and a protection program.

Means for Solving Problem

The power cutoff device according to the first invention is a power cutoff device that monitors the temperature of a relay for cutting off the power supply to an electrical device, and determines whether to cut off the power supply, the power cutoff device comprising a relay, a temperature calculation unit, and a determination unit. The relay includes a drive coil. The temperature calculation unit calculates the temperature of the drive coil by calculating the resistance value of a resistor that changes with temperature, when the drive coil included in the relay is regarded as this resistor. The determination unit determines whether or not to cut off the power supply on the basis of the temperature of the drive coil calculated by the temperature calculation unit.

Here, in a power cutoff device that includes a relay for cutting off the power supply to an electrical device as needed, if the drive coil included in the relay is regarded as a resistor, the fact that the resistance value of the drive coil changes with temperature is utilized to calculate the temperature of the drive coil on the basis of the resistance value and determine whether or not to cut off the power supply.

Consequently, it can be easily determined whether or not to cut off the power supply by detecting that the relay has reached an abnormally high temperature state by calculating the resistance value of the drive coil included in the relay.

As a result, the function of protecting a power cutoff device including a relay can be improved without having to use a separate temperature sensor or the like to sense the temperature.

The power cutoff device according to the second invention is the power cutoff device according to the first invention, wherein the determination unit determines that an abnormality has occurred and determines to cut off the power supply in the event that the temperature increase exceeds a first threshold within a specific length of time.

Here, the specific length of time is, for example, about 1 to 3 seconds, and the first threshold is set to 20° C. or to an attained temperature of 100° C., for example.

Consequently, when a temperature increase exceeding the first threshold value is detected within a specific period of time, it is determined that an abnormality has occurred due to an abrupt temperature increase, and power supply can be cut off to ensure safety.

The power cutoff device according to the third invention is the power cutoff device according to the first or second invention, wherein the determination unit determines that the state is normal and determines not to cut off the power supply in the event that the temperature increase does not exceed the first threshold within a specific length of time.

Consequently, even if there is a gradual temperature increase within a specific period of time, for example, it can be determined that the state is normal because the temperature increase was not abrupt, and that the power supply should not be cut off.

The power cutoff device according to the fourth invention is the power cutoff device according to the first or second invention, wherein the determination unit determines that an abnormality has occurred and determines to cut off the power supply in the event that the temperature increase exceeds a second threshold.

Here, the specific length of time is about 5 seconds, for example, and the second threshold is set to 100° C., for example.

Consequently, in the event that the second threshold is reached even though the temperature increase is gradual, it can be determined that there is the risk that an abnormality has occurred, and the power supply can be cut off to improve safety.

The power cutoff device according to the fifth invention is the power cutoff device according to the fourth invention, further comprising an operation restoration determination unit that restores the operation of the relay in the event that the temperature is below a third threshold for determining operation restoration after the determination unit has determined that the temperature increase exceeds the second threshold and cuts off the power supply.

Here, the third threshold is set in order to restore the operation of a relay that has had its power supply cut off, and is set to 70° C., for example.

Consequently, in the event that the power supply is cut off because a moderate temperature increase has exceeded the second threshold, for example, the operation of the relay can be restored if the temperature of the drive coil drops below the third threshold after the power supply is cut off.

Consequently, unlike when the power supply is cut off due to an abrupt temperature increase, when the power supply is cut off due to a gradual temperature increase, the relay operation is automatically restored, eliminating the need to dispatch a worker, which lessens the burden on the user.

The power cutoff device according to the sixth invention is the power cutoff device according to the fifth invention, wherein the operation restoration determination unit determines not to restore the operation of the relay in the event that there is a sudden temperature increase exceeding a first threshold within a specific length of time.

Consequently, in the event that the power supply is cut off due to an abrupt temperature increase exceeding the first threshold value, for example, it is determined that automatic recovery will involve some risk, and measures such as dispatching a worker can be taken without performing processing to restore the operation of the relay.

The power cutoff device according to the seventh invention is the power cutoff device according to the first or second invention, wherein the temperature calculation unit calculates the temperature of the drive coil by using a first resistor for calculating the temperature of the drive coil when the relay is in operation and a second resistor for calculating the temperature of the drive coil when the relay is not in operation.

Consequently, by calculating the temperature of the drive coil using different resistors (first resistor and second resistor) when the relay is in operation and when the relay is not in operation, current at or below the drive current for driving the drive coil can be applied while the temperature of the drive coil can also be calculated when the relay is not operating.

The power cutoff device according to the eighth invention is the power cutoff device according to the first or second invention, further comprising a communication unit that transmits information about the determination result produced by the determination unit to the outside.

Consequently, the user of the power cutoff device, the administrator, etc., can be prompted to take appropriate measures by sending the determination result regarding the temperature increase in the relay of a power cutoff device.

The power cutoff device according to the ninth invention is the power cutoff device according to the eighth invention, wherein the communication unit changes the destination to which the information about the determination result is transmitted according to the determination result produced by the determination unit.

Consequently, for example, when restoration of operation requires inspection or restoration work by an expert worker, or when restoration of operation is possible automatically, it is possible to make appropriate contact with just the necessary people.

The power cutoff device according to the tenth invention is the power cutoff device according to the ninth aspect, further comprising an operation restoration determination unit that restores the operation of the relay in the event that the temperature is below a third threshold for determining operation restoration after the determination unit has determined that the temperature increase exceeds the second threshold and cuts off the power supply. When the operation restoration determination unit determines not to restore the operation of the relay, the communication unit transmits information about the cutoff of the power supply to an administrator of the electrical device.

Consequently, when the power supply is cut off due to an abrupt temperature increase, the determination result can be communicated to the administrator of the power cutoff device.

The power cutoff device according to the eleventh invention is the power cutoff device according to the ninth aspect, further comprising an operation restoration determination unit that restores the operation of the relay in the event that the temperature is below a third threshold for determining operation restoration after the determination unit has determined that the temperature increase exceeds the second threshold and cuts off the power supply. When the operation restoration determination unit determines to restore the operation of the relay, the communication unit transmits information about the cutoff of the power supply to at least the user of the electrical device.

Consequently, when the power supply is cut off due to a gradual temperature increase that allows for automatic restoration of operation, no work is required to restore operation, so only the user need be contacted, not the administrator.

The power cutoff system according to the twelfth invention comprises the power cutoff device according to the first or second invention, a transmission device, and a cloud server. The transmission device transmits information about the determination result produced by the determination unit to the outside. The cloud server is connected to a user and an administrator of the electrical equipment via the Internet, and information about the determination result is transmitted from the transmission device to the cloud server.

Consequently, because the determination result regarding the cutoff of power supply to the relay is transmitted from the power cutoff device to the connected cloud server, users and administrators connected to the cloud server via the Internet can share information related to the determination result.

The power cutoff system according to the thirteenth invention is a power cutoff system that monitors the temperature of a relay for cutting off the power supply to an electrical device and determines whether to cut off the power supply, the system comprising a power cutoff device and a cloud server that communicates with the power cutoff device. The power cutoff device has a relay including a drive coil, and a communication unit that communicates with the cloud server. The cloud server has a temperature calculation unit and a determination unit. The temperature calculation unit calculates the temperature of the drive coil included in the relay by acquiring information about the relay received via the communication unit, and calculating the resistance value of a resistor that changes with temperature, when the drive coil is regarded as this resistor. The determination unit determines whether or not to cut off the power supply on the basis of the temperature of the drive coil calculated by the temperature calculation unit.

Here, in a power cutoff system comprising a cloud server and a power cutoff device that includes a relay for cutting off the power supply to an electrical device as needed, when the drive coil included in the relay is considered to be a resistor, the cloud server can use the fact that the resistance value of the drive coil changes with temperature to calculate the temperature of the drive coil on the basis of this resistance value, and determine whether or not to cut off the power supply.

Consequently, whether or not to cut off the power supply can be easily determined by detecting that the relay has reached an abnormally high temperature state by calculating the resistance value of the drive coil included in the relay.

As a result, the function of protecting a power cutoff device including a relay can be improved without having to use a separate temperature sensor or the like for sensing the temperature.

The power cutoff device protection method according to the fourteenth invention is a method for protecting a power cutoff device that monitors the temperature of a relay for cutting off the power supply to an electrical device and determines whether to cut off the power supply, the method comprising a temperature calculation step and a determination step. The temperature calculation step involves calculating the temperature of the drive coil included in the relay by calculating the resistance value of a resistor that changes with temperature when the drive coil is regarded as a resistor. The determination step involves determining whether or not to cut off the power supply on the basis of the temperature of the drive coil calculated in the temperature calculation step.

Here, in a power cutoff device that includes a relay for cutting off the power supply to an electrical device as needed, if the drive coil included in the relay is regarded as a resistor, the fact that the resistance value of the drive coil changes with temperature is utilized to calculate the temperature of the drive coil on the basis of the resistance value and determine whether or not to cut off the power supply.

Consequently, whether or not to cut off the power supply can be easily determined by detecting that the relay has reached an abnormally high temperature state by calculating the resistance value of the drive coil included in the relay.

As a result, the function of protecting a power cutoff device including a relay can be improved without having to use a separate temperature sensor or the like for sensing the temperature.

The power cutoff device protection program according to the fifteenth invention is a program for protecting a power cutoff device that monitors the temperature of a relay for cutting off the power supply to an electrical device and determines whether to cut off the power supply, the program causing a computer to execute a power cutoff device protection method comprising: a temperature calculation step and a determination step. The temperature calculation step involves calculating the temperature of the drive coil included in the relay by calculating the resistance value of a resistor that changes with temperature when the drive coil is regarded as a resistor. The determination step involves determining whether or not to cut off the power supply on the basis of the temperature of the drive coil calculated in the temperature calculation step.

Here, in a power cutoff device that includes a relay for cutting off the power supply to an electrical device as needed, if the drive coil included in the relay is regarded as a resistor, the fact that the resistance value of the drive coil changes with temperature is utilized to calculate the temperature of the drive coil on the basis of the resistance value and determine whether or not to cut off the power supply.

Consequently, it can be easily determined whether or not to cut off the power supply by detecting that the relay has reached an abnormally high temperature state by calculating the resistance value of the drive coil included in the relay.

As a result, the function of protecting a power cutoff device including a relay can be improved without having to use a separate temperature sensor or the like to sense the temperature.

Effects

With the power cutoff device according to the present invention, the function of protecting a power cutoff device including a relay can be improved without having to use a separate temperature sensor or the like to sense the temperature.

DETAILED DESCRIPTION OF THE EMBODIMENT

A power cutoff device 20 and a power cutoff system 1 including the same according to an embodiment of the present invention will now be described with reference to FIGS. 1 to 6.

In this embodiment, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

(1) Configuration of Power Cutoff System 1

Figure 1:
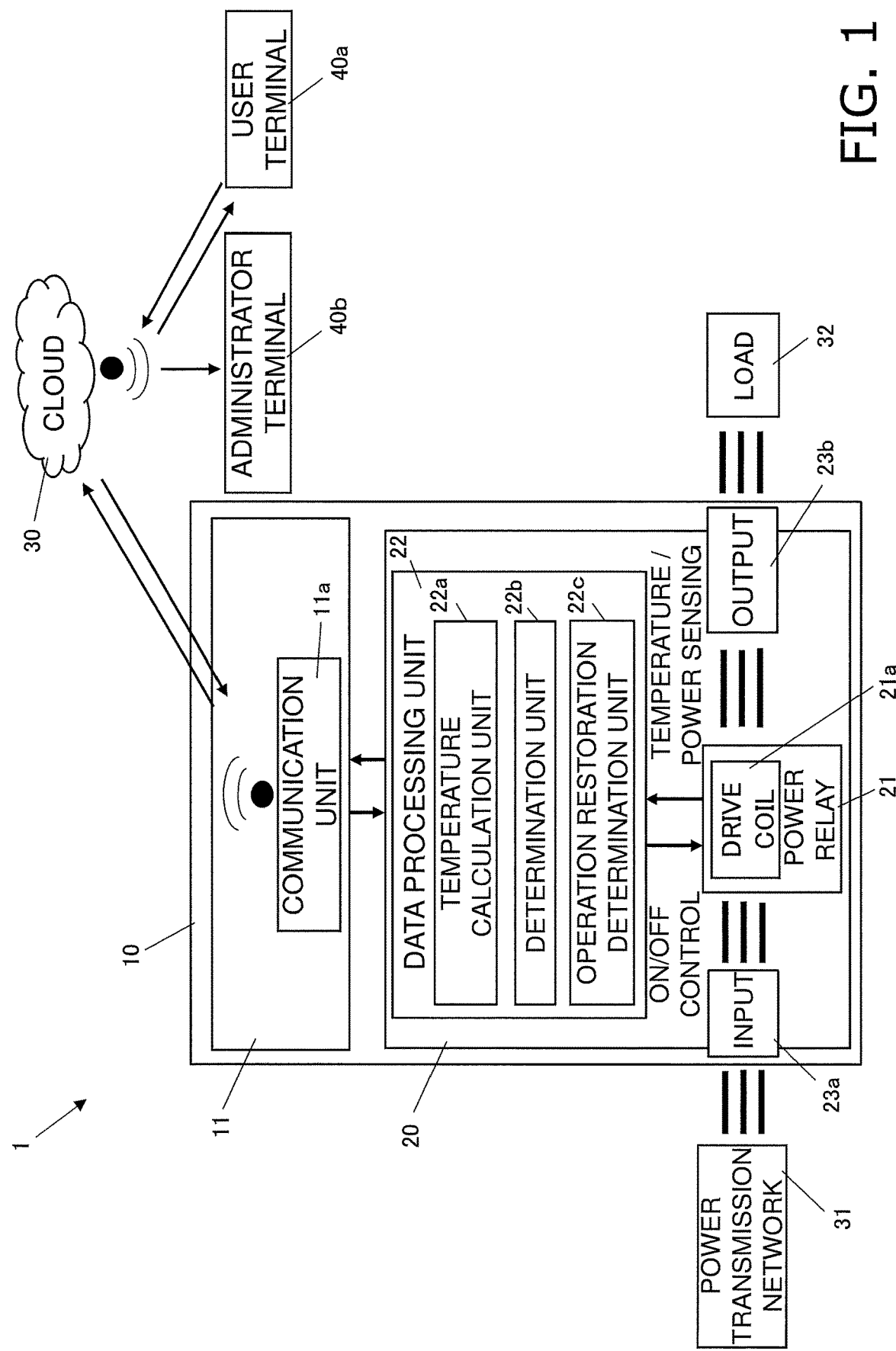
FIG. 1 is a block diagram of the configuration of a power cutoff system including the power cutoff device according to an embodiment of the present invention.

As shown in FIG. 1, the power cutoff system 1 according to this embodiment is a system for cutting off power supplied from a power transmission network 31 to a load (electrical device) 32 on the basis of a specific condition, and includes a power cutoff module 10 and a cloud server 30.

As shown in FIG. 1, the power cutoff module 10 comprises a communication module 11 and the power cutoff device 20.

As shown in FIG. 1, the communication module 11 is connected to the power cutoff device 20 and has a communication unit 11a.

As shown in FIG. 1, the communication unit 11a is wirelessly connected to the cloud server 30, and transmits data such as the determination result of the power cutoff device 20 (discussed below) to the cloud server 30. Also, the communication unit 11a receives instruction input from the user terminal 40a, the administrator terminal 40b, etc., and transmits this to the power cutoff device 20 side. Furthermore, the communication unit 11a selectively changes the transmission destination of the determination result or other data according to the determination result in the power cutoff device 20 (discussed below).

As shown in FIG. 1, the power cutoff device 20 is provided between the power transmission network 31 and the load 32, determines whether or not to supply the power supplied from the power transmission network 31 directly to the load 32, and cuts off the supply of power to the load 32 when a specific condition is met in order to ensure safety.

The detailed configuration of the power cutoff device 20 will be described below.

(2) Configuration of Power Cutoff Device 20

The power cutoff device 20 according to this embodiment is a device that monitors the temperature of a power relay 21 for cutting off power supply to a load (electrical device, etc.) 32 and determines whether or not to cut off the supply of power, and as shown in FIG. 1, comprises a power relay 21, a data processing unit 22, an input 23a, and an output 23b.

Figure 2:
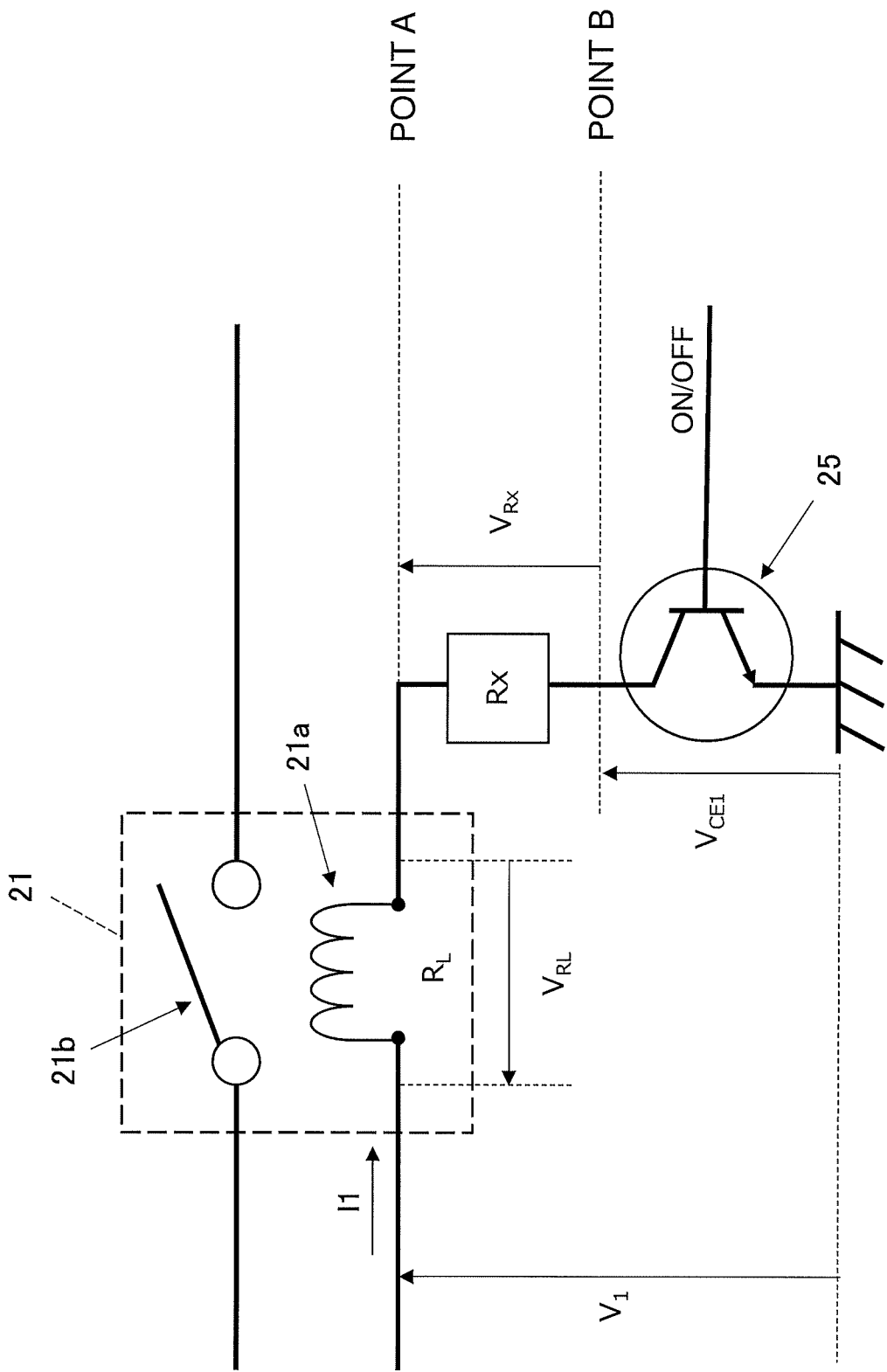
FIG. 2 is an electrical circuit diagram of the configuration around a drive coil while a power relay included in the power cutoff device of FIG. 1 is being driven.

The power relay 21 is a safety device provided to cut off the supply of power to the load 32 when a temperature increase exceeding a specific threshold has been detected, and as shown in FIG. 1, has a drive coil 21a and a switching unit 21b (see FIG. 2).

The drive coil 21a is one of the components that make up the power relay 21, and is formed primarily from copper wire. If the drive coil 21a is regarded as a resistor in an electrical circuit, the resistance value will vary with temperature.

As shown in FIG. 2, the power cutoff device 20 of this embodiment takes advantage of the fact that the resistance value $R_L$ (when the drive coil 21a is regarded as a resistor) changes with temperature, and detect a temperature change on the basis of the resistance value to detect that there is an abnormal temperature increase, for example, and to determine whether or not to cut off the supply of power to the load 32.

As shown in FIG. 2, the switching unit 21b is a switching means provided to the power relay 21 and switches the power supply to the load 32 between an ON state and an OFF state.

As shown in FIG. 1, the data processing unit 22 performs ON/OFF control of the power relay 21, and temperature sensing and power detection for the power relay 21 (drive coil 21a). The data processing unit 22 has a temperature calculation unit 22a, a determination unit 22b, and an operation restoration determination unit 22c.

The temperature calculation unit 22a calculates the temperature of the drive coil 21a by calculating the resistance value $R_L$ of the drive coil 21a, which changes with temperature, when the drive coil 21a included in the power relay 21 is regarded as a resistor.

The temperature calculation unit 22a calculates the temperature of the drive coil 21a by using the resistance (first resistance) $R_x$ (see FIG. 2) for calculating the temperature of the drive coil 21a when the power relay 21 is in operation, and the resistance (second resistance) $R_y$ and $R_z$ (see FIG. 3) for calculating the temperature of the drive coil 21a when the power relay 21 is not in operation.

The processing to calculate the temperature of the drive coil 21a will be described in further detail below.

The determination unit 22b determines whether or not to cut off the supply of power to the load 32 on the basis of the temperature of the drive coil 21a calculated by the temperature calculation unit 22a.

Figure 4:
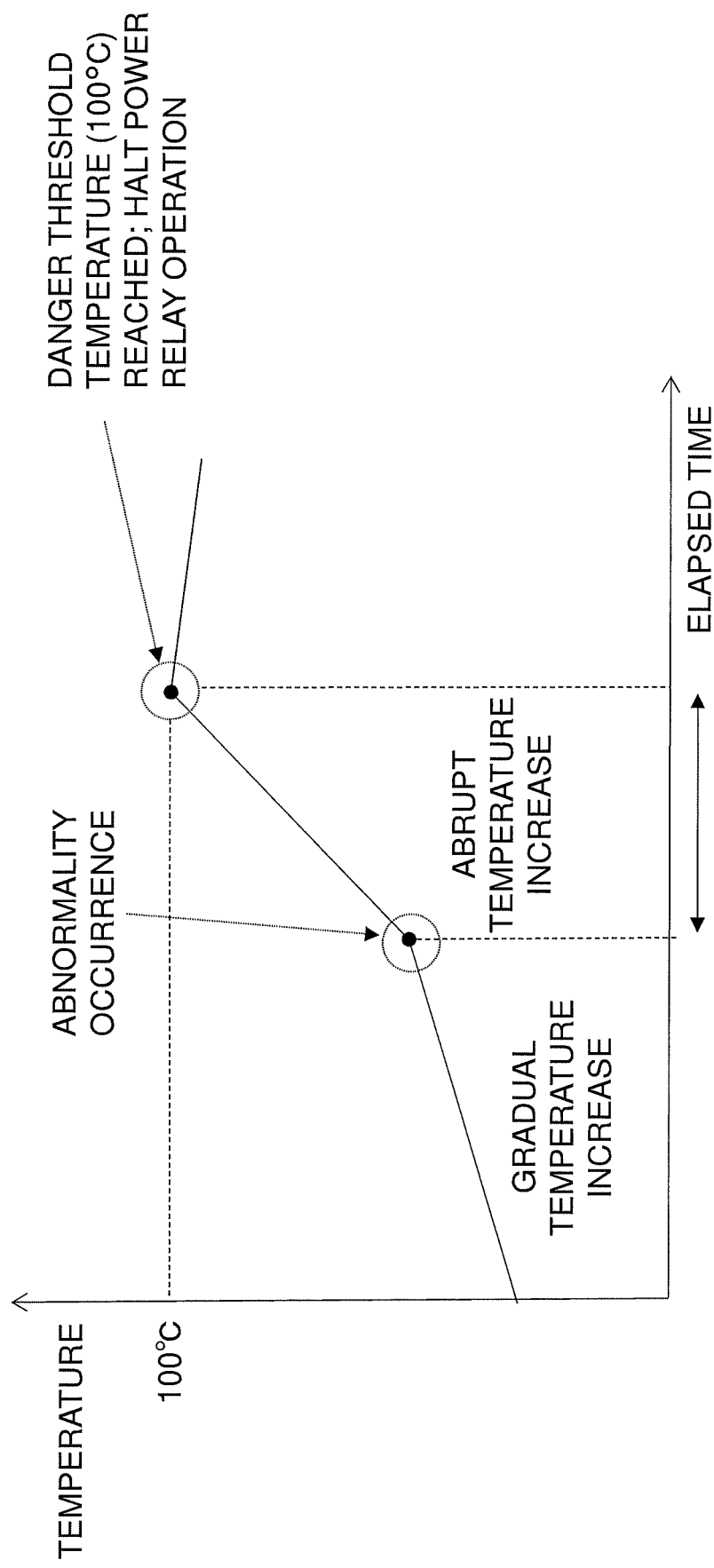
FIG. 4 is a graph of the change in temperature of the drive coil with respect to the elapsed time when an abnormality has occurred that prevents operation from being restored in the power cutoff device of FIG. 1.

More specifically, as shown in FIG. 4, when there is an abrupt temperature increase exceeding a first threshold value (such as 100° C.) within a specific length of time (such as 3 seconds), the determination unit 22b determines that an abnormality has occurred and determines to cut off the supply of power to the load 32 (to halt the operation of the power relay 21).

At this point, instead of the condition that the temperature increase within a specific length of time (such as 3 seconds) exceed a specific first threshold value (such as 100° C.), the determination regarding an abrupt temperature increase may be performed using the condition that the temperature increase per unit time exceed a specific threshold (such as 20° C./sec).

On the other hand, if the temperature increase does not exceed the first threshold within the specific length of time, the determination unit 22b determines that the state is normal and does not cut off the supply of power to the load 32 (keeps the power relay 21 operating).

Figure 5:
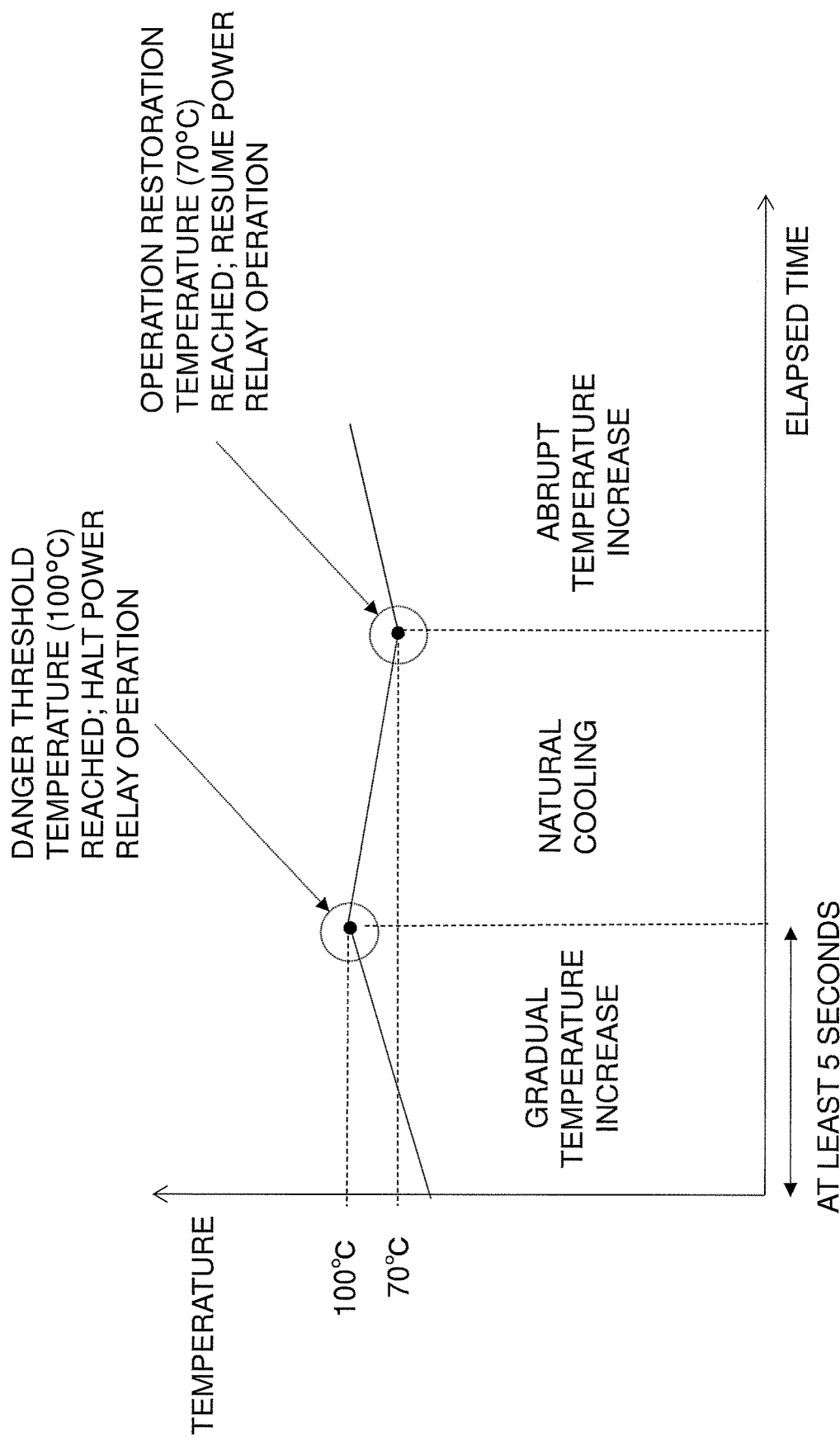
FIG. 5 is a graph of the change in temperature of the drive coil with respect to elapsed time when an abnormality has occurred in which operation can be restored in the power cutoff device of FIG. 1.

Also, when there is a temperature increase in which a second threshold (such as 100° C.) is exceeded gradually, as shown in FIG. 5, the determination unit 22b determines that an abnormality has occurred and determines to cut off the supply of power to the load 32 (to halt the operation of the power relay 21).

As shown in FIG. 5, when it is determined by the determination unit 22b that there is a temperature increase in which the second threshold (such as 100° C.) is exceeded and it is determined to cut off the supply of power to the load 32, and then the power relay 21 cools naturally over time and the temperature of the drive coil 21a falls below a third threshold (such as 70° C.) for determining the restoration of operation, the operation restoration determination unit 22c restarts (restores) the operation of the power relay 21.

On the other hand, if there is an abrupt temperature increase in which the first threshold (such as 100° C.) is exceeded within a specific length of time (such as 1 to 3 seconds), the operation restoration determination unit 22c determines not to restore the operation of the power relay 21.

Processing to Calculate Temperature of Power Relay 21 (Drive Coil 21a)

With the above configuration, the power cutoff device 20 in this embodiment calculates the temperature of the drive coil 21a included in the power relay 21, and thereby detects whether or not the power relay 21 (drive coil 21a) is at an abnormally high temperature, and if the temperature is abnormally high, the supply of power to the load 32 is cut off.

Here, the method for calculating the temperature of the drive coil 21a is as follows.

The upper limit temperature of the power relay 21 depends on the temperature of the drive coil 21a, which is generally made from copper wire.

Here, the temperature increase in a copper winding of a coil or the like can be found by a resistance method using the following relational formula (1).

Mathematical Formula 1

$$RT = Rt\left\{1 + \frac{1}{234.5 + t}(T - t)\right\} \quad (1)$$

Where t is the coil temperature before testing (° C.), T is the coil temperature after testing (° C.), Rt is the coil resistance (Ω) at the temperature t, RT is the coil resistance (Ω) at the temperature T, and 234.5 is a constant of copper.

For example, in the case of a power relay 21 (product A) in which the resistance value of the drive coil 21a is 47 Ω at 23° C., if the temperature of the drive coil 21a changes, the resistance value RT after the temperature change (120° C., −5° C.) is calculated using the following relational formulas 2 and 3, respectively.

120° C. is the typical maximum rated temperature of the power relay 21, and −5° C. is the minimum usage temperature for the power relay 21.

Mathematical Formula 2

$$RT\,(120°\,C.) = 47 \times \left\{1 + \frac{1}{234.5 + 23}(120 - 23)\right\} \quad (2)$$

Mathematical Formula 3

$$RT\,(-5°\,C.) = 47 \times \left\{1 + \frac{1}{234.5 + 23}(-5 - 23)\right\} \quad (3)$$

FIG. 2 shows an electrical circuit featuring a resistor RX used to calculate the temperature of the drive coil 21a while the power relay 21 is in operation.

Here, in the electrical circuit diagram around the power relay 21 shown in FIG. 2, the drive coil 21a of the power relay 21 can be regarded as a resistor (resistance value $R_L$) except during transitions. The resistance value $R_L$ is calculated using the following relational formula 4.

Mathematical Formula 4

$$R_L = \frac{V_{RL}}{I_1} = \frac{V_1 - V_{Rx} - V_{CE1}}{\frac{V_{Rx}}{R_x}} = \frac{R_x(V_1 - V_{Rx} - V_{CE1})}{V_{Rx}} \quad (4)$$

In FIG. 2, the resistance value Rx of the resistor (first resistor), which is used when calculating the temperature during operation of the drive coil 21a, is a specified value, and for $V_1/V_{RL}/V_{CE1}$, the resistance value $R_L$ when the drive coil 21a is regarded as a resistor can be acquired by using an A/D converter to acquire a voltage value.

$I_1$ is the current flowing through the resistor when the drive coil 21a is regarded as a resistor. $V_1$ is the voltage across the power relay 21. $V_{RL}$ is the voltage applied across both ends of the drive coil 21a when the drive coil 21a is considered to be a resistor. $V_{RX}$ is the voltage across both ends of the resistor (first resistor) Rx, which is used when calculating the temperature during operation of the drive coil 21a. $V_{CE1}$ is the voltage applied between ground and a point B (transistor 25).

Here, in the above-mentioned relational formula 1, since $RT=R_L$, the temperature of the drive coil 21a when the resistance value is $R_L$ is shown by modifying the relational formula 1 to obtain the following relational formula 5.

Mathematical Formula 5

$$T = \left(\frac{R_L}{RT} - 1\right)(234.5 + t) + t \quad (5)$$

For example, in the case of a power relay 21 (product A) in which the resistance value of the drive coil 21a is 47 Ω at 23° C., RT=47 (Ω), so the temperature T of the drive coil 21a is calculated using the following relational formula 6.

Mathematical Formula 6

$$T = \left(\frac{R_L}{47} - 1\right)(234.5 + 23) + 23 \quad (6)$$

Consequently, whether or not the power relay 21 has reached an abnormally high temperature can be determined by directly calculating the temperature T from the resistance value of the drive coil 21a itself, without having to use a temperature sensor or the like.

In the electrical circuit diagram shown in FIG. 2, when $V_1=5$ V, the voltage Va at point A=2.16 V, the voltage Vb at point B=0.05 V, and the resistor Rx=47Ω, for example, $V_{RL}$ is calculated as 2.89 (V), $I_1$=0.045 (A), and the resistance value RL of the drive coil 21a is 64.22 (Ω), from the following relational formulas 7, 8, and 9.

Mathematical Formula 7

$$V_{RL} = V_1 - V_{Rx} - V_{CE1} = V_1 - (V_a - V_b) - V_b = 5 - 2.11 = 2.89\,V \quad (7)$$

Mathematical Formula 8

$$I_1 = \frac{V_x}{R_x} = \frac{V_a - V_b}{Rx} = \frac{2.16 - 0.05}{47} \approx 0.045A \quad (8)$$

Mathematical Formula 9

$$R_L = \frac{V_{RL}}{I_1} = \frac{2.89\,V}{0.045A} \approx 64.22\Omega \quad (9)$$

Consequently, the temperature T of the drive coil 21*a* is calculated to be about 117 (° C.) from the following relational formula 10.

Mathematical Formula 10

$$T = \left(\frac{64.22}{47} - 1\right)(234.5 + 23) + 23 ≒ 117° C. \quad (10)$$

Figure 3:
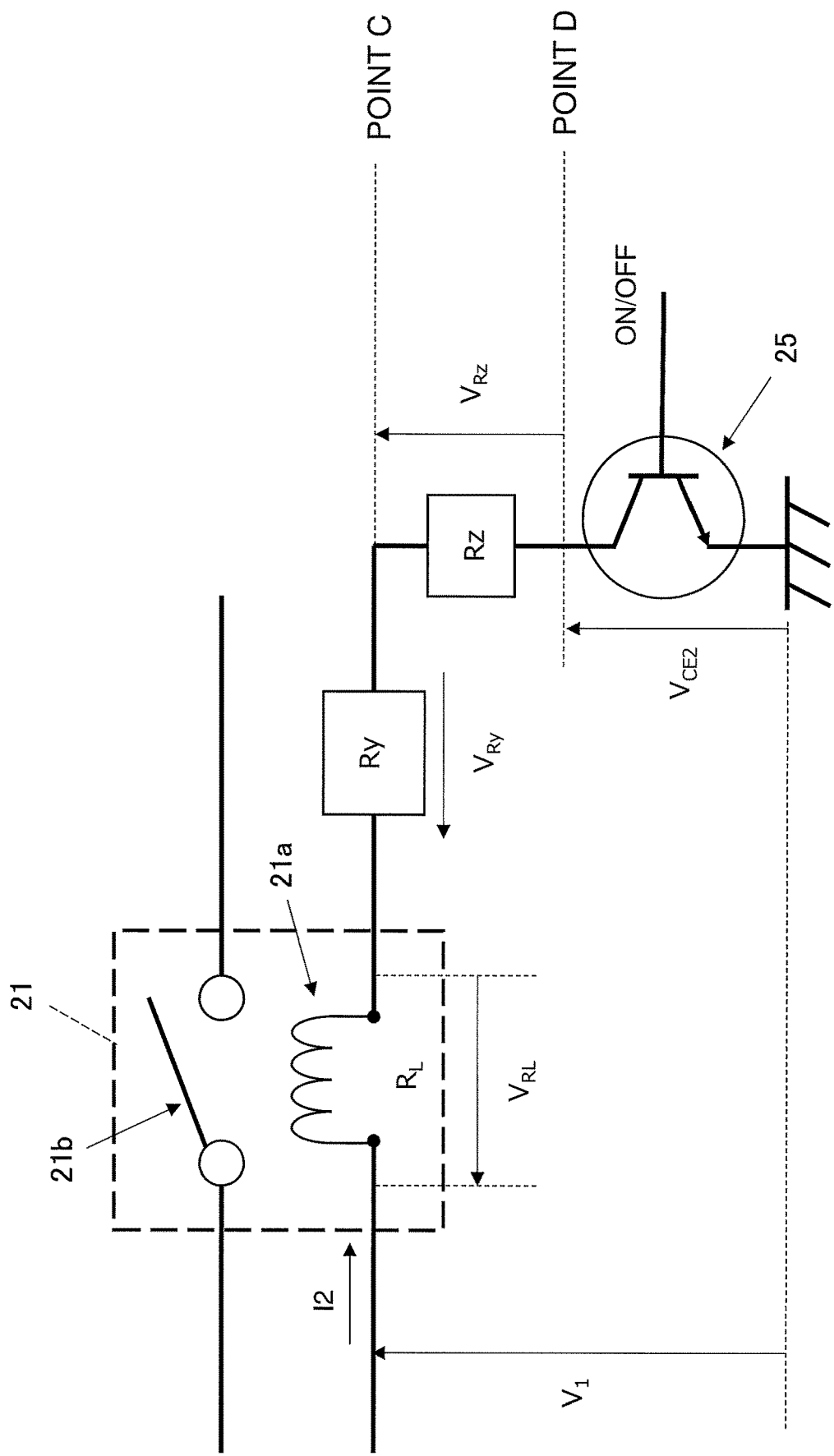
FIG. 3 is an electrical circuit diagram of the configuration around the drive coil during cooling of the power relay included in the power cutoff device of FIG. 1.

FIG. 3 shows an electrical circuit featuring a resistor RX, which is used to calculate the temperature of the drive coil 21*a* while the power relay 21 is not in operation (during cooling).

At this time, in order to calculate the resistance value $R_L$ when the drive coil 21*a* is regarded as a resistor while the power relay 21 is in a non-drive state, resistors (second resistors) $R_y$ and $R_z$ with a capacity that does not allow drive by the power relay 21 are connected in series to the drive coil 21*a*, and a test current less than the drive current is sent through to calculate the resistance value $R_L$ of the drive coil 21*a*.

In the case of the above-mentioned product A, since the drive current of the drive coil 21*a* is set to at least 100 mA, the test current is set to less than 100 mA.

Since the resistance values $R_y$ and $R_z$ are specified values, the resistance value $R_L$ of the drive coil 21*a* can be calculated by specifying the voltage values at the points C and D.

In the electrical circuit diagram shown in FIG. 3, $V_{Rz}=V_C-V_D$, $V_{CE1}=V_D$, $I_2=V_{Rz}/R_z$, $V_{Ry}=I_2 \times R_y$, $V_{RL}=V_1-V_{Ry}-V_{Rz}-V_{CE1}$, the resistance value $R_L$ when the drive coil 21*a* is regarded as a resistor is shown by the following relational formula 11.

Mathematical Formula 11

$$R_L = \frac{V_{RL}}{I_2} = \frac{(V_1 - V_{Ry} - V_{Rz} - V_{CE2})}{\frac{V_{Rz}}{R_z}} = \frac{R_z(V_1 - V_{Ry} - V_{Rz} - V_{CE2})}{V_{Rz}} \quad (11)$$

For example, when $V_1=5$ V, the voltage $V_C$ at point C=2.4 V, the voltage $V_D$ at point D=0.05 V, the resistor $R_y=470\Omega$, and $R_z=470\Omega$, the resistance value $R_L$ of the drive coil 21*a* is calculated to be approximately 50 ($\Omega$) from the following relational formula 12.

Mathematical Formula 12

$$R_L = \frac{V_{RL}}{I_2} = \frac{R_z(V_1 - V_{Ry} - V_{Rz} - V_{CE2})}{V_{Rz}} \quad (12)$$

$$= \frac{R_z\left(V_1 - \frac{V_C - V_D}{R_z} \cdot R_y - (V_C - V_D) - V_{CE2}\right)}{V_C - V_D}$$

$$= \frac{470 \times \left(5 - \frac{2.4 - 0.05}{470} \cdot 470 - (2.4 - 0.05) - 0.05\right)}{2.4 - 0.05} = 50\Omega$$

Consequently, the temperature T of the drive coil 21*a* is calculated to be approximately 39.43 (° C.) from the following relational formula 13.

Mathematical Formula 13

$$T = \left(\frac{50}{47} - 1\right)(234.5 + 23) + 23 ≒ 39.43° C. \quad (13)$$

Method for Protecting Power Cutoff Device 20

The method for protecting the power relay 21 of this embodiment will now be described using the flowchart shown in FIG. 6.

Figure 6:
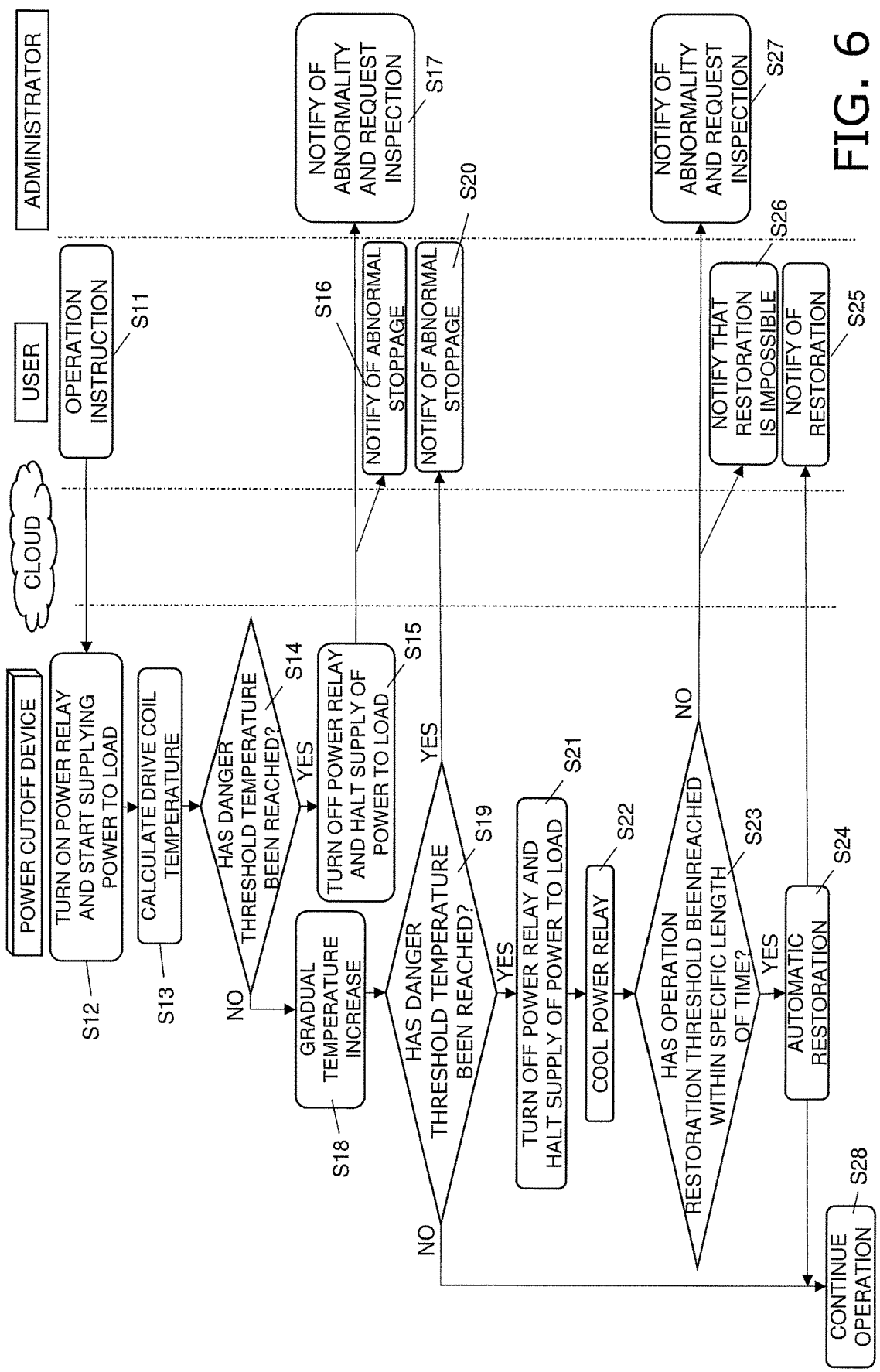
FIG. 6 is a flowchart showing the flow of processing of the power cutoff device protection method of FIG. 1.

That is, as shown in FIG. 6, in step S11 the user of the power cutoff system 1 uses the user terminal 40*a* or the like to input an operation instruction to the power cutoff device 20, and then in step S12 the power cutoff device 20 turns on the power relay 21 and starts supplying power from the power transmission network 31 to the load 32.

Next, in step S13, the temperature calculation unit 22*a* of the power cutoff device 20 calculates the temperature of the drive coil 21*a* from the change in the resistance value of the drive coil 21*a* of the power relay 21, and monitors whether or not an abrupt temperature increase is occurring (see FIG. 4).

Next, in step S14, the determination unit 22*b* of the power cutoff device 20 determines whether or not the temperature has reached 100° C., which was set as the danger threshold temperature (first threshold).

Here, if the calculated temperature of the drive coil 21*a* has reached the danger threshold temperature (100° C.), the processing proceeds to step S15, and otherwise the processing proceeds to step S18.

Next, in step S15, since it was determined in step S14 that there is an abrupt temperature increase exceeding the danger threshold temperature, the data processing unit 22 turns off the power relay 21 (switching unit 21*b*) to halt the supply of power to the load 32.

Next, in step S16, the communication unit 11*a* of the communication module 11 notifies the user terminal 40*a* owned by the user that the power relay 21 has stopped under abnormal conditions, and in step S17, a message requesting an inspection is sent to the administrator terminal 40*b* along with the notification of the abnormality.

Meanwhile, in step S18, since it was determined in step S14 that the temperature of the drive coil 21*a* has not reached the danger threshold temperature (100° C.), the determination unit 22*b* determines that the temperature is rising gradually.

Next, in step S19, it is determined whether or not the danger threshold temperature (100° C.) has been reached as a result of a gradual temperature increase.

Here, if the temperature of the drive coil 21*a*, whose temperature is gradually rising, has reached the danger threshold temperature (100° C.), the processing proceeds to steps S20 and S21, and otherwise the processing proceeds to step S28. The processing in steps S20 and S21 is performed substantially simultaneously.

Next, in step S20, since it was determined in step S19 that the danger threshold temperature (100° C.) has been reached even though the temperature increase is gradual, the communication unit 11*a* of the communication module 11 transmits an abnormal stop notification only to the user terminal 40*a* owned by the user.

Here, the reason why the communication unit 11*a* does not send an abnormal stop notification or the like to the administrator terminal 40*b* owned by the administrator is that when the temperature reaches the danger threshold temperature (100° C.) due to a gradual temperature increase, there is a low probability that parts such as the power relay 21 will be damaged due to a short circuit or the like, and work such as inspection by the administrator is considered unnecessary.

Next, in step S21, since it was determined in step S19 that the danger threshold temperature (100° C.) was reached even though the temperature increase was gradual, the data processing unit 22 turns off the power relay 21 (switching unit 21b), and halts the supply of power to the load 32.

Next, in step S22, the power relay 21, while still in its off state, is allowed to stand for a specific length of time (such as 30 to 60 minutes) to cool.

Next, in step S23, the temperature calculation unit 22a measures the temperature while the power relay 21 is not in operation (see FIG. 3), and the operation restoration determination unit 22c determines whether or not the temperature of the drive coil 21a has decreased to a specific operation restoration temperature (such as 70° C.).

Here, if the temperature has decreased to the operation restoration temperature, the processing proceeds to step S24, and otherwise the processing proceeds to steps S26 and S27.

Next, in step S24, since it was determined in step S23 that the temperature of the drive coil 21a had decreased to the operation restoration temperature, the data processing unit 22 turns on the switching unit 21b and automatically restores the power relay 21 to operation.

Next, in step S25, the communication unit 11a of the communication module 11 transmits to only the user terminal 40a owned by the user a notification that the power relay 21 has been automatically restored.

On the other hand, in step S26, since it was determined in step S23 that the temperature of the drive coil 21a had not decreased to the operation restoration temperature, it is determined that another abnormality due to environmental factors or the like has occurred, and a notice to the effect that restoration is impossible is transmitted to the user terminal 40a owned by the user, and in step S27, a message requesting an inspection is sent to the user terminal 40a owned by the user, along with the notification of the abnormality.

Next, in step S28, since it was determined in step S19 that the temperature had not reached the danger threshold temperature (100° C.) as a result of a gradual temperature increase, it is determined that the temperature is not abnormally high, and the power relay 21 continues operating.

Other Embodiments

An embodiment of the present invention was described above, but the present invention is not limited to or by the above embodiment, and various modifications are possible without departing from the gist of the invention.

(A)

In the above embodiment, an example was given in which the present invention was realized as a power cutoff device and a method for protecting it. However, the present invention is not limited to this.

For example, the present invention may be realized as a protection program that causes a computer to execute the above-mentioned power cutoff device protection method.

This power cutoff device protection program is stored in a memory (storage unit) installed in the power cutoff device, and the CPU reads the protection program stored in the memory and causes the hardware to execute the steps of the program. More specifically, the same effect as described above can be obtained by having the CPU read the protection program and execute the above-mentioned temperature calculation step and determination step.

Also, the present invention may be realized as a recording medium that stores a power cutoff device protection program.

(B)

In the above embodiment, an example was given in which the temperature calculation unit 22a and the determination unit 22b provided inside the power cutoff device 20 calculated the temperature of the drive coil 21a included in the power relay 21, and determined whether or not to cut off the power supply. However, the present invention is not limited to this.

Figure 7:
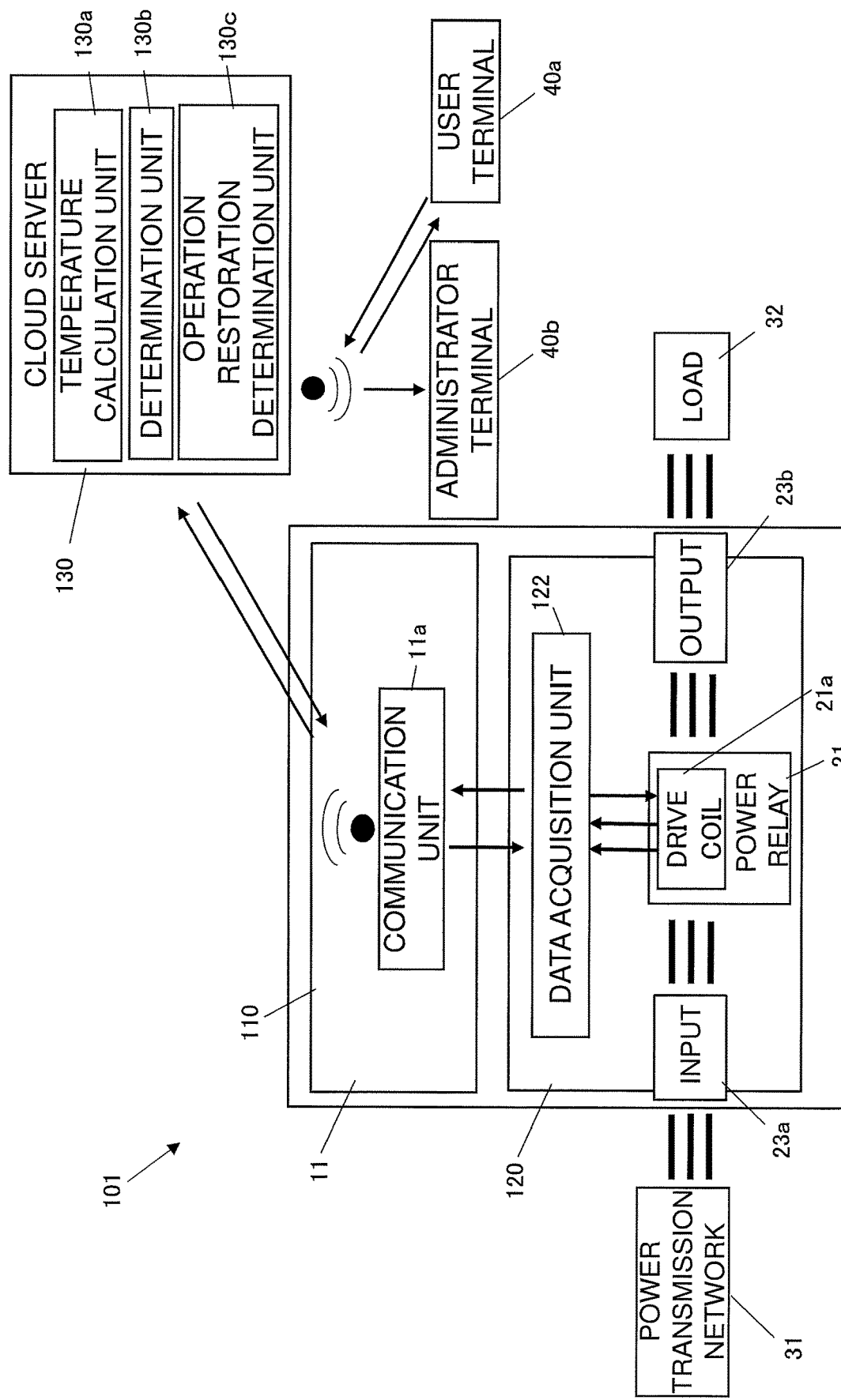
FIG. 7 is a block diagram of the configuration of the power cutoff system according to another embodiment of the present invention.

For example, as shown in FIG. 7, what calculates the temperature of the drive coil 21a included in the power relay 21 and determines whether or not to cut off the power supply on the basis of the calculated temperature may instead be a power cutoff system 101 provided on the cloud server 130 side.

That is, as shown in FIG. 7, the power cutoff system 101 may be configured such that the power cutoff device 120 comprises a data acquisition unit 122 that acquires data about changes in the resistance value from the drive coil 21a included in the power relay 21, and data is transmitted to the cloud server 130 via the communication unit 11a of the communication module 11 in a power cutoff module 110.

In this case, a temperature calculation unit 130a provided to the cloud server 130 calculates the temperature of the drive coil 21a, and whether or not to cut off the power supply to the load 32 is determined on the basis of the temperature calculated by the determination unit 130b, whereby the same effect as in the above embodiment can be obtained.

Also, an operation restoration determination unit 130c may also be provided on the cloud server 130 side.

(C)

In the above embodiment, an example was given in which the danger threshold temperature (first threshold) serving as the upper limit for an abrupt temperature increase and the danger threshold temperature (second threshold) serving as the upper limit for a gradual temperature increase were both set to 100° C. However, the present invention is not limited to this.

For example, the first threshold and the second threshold may be set to different temperatures.

Also, the first threshold and the second threshold may be set to temperatures above 100° C., or may be set to temperatures below 100° C.

(D)

In the above embodiment, an example was given in which the power relay 21 was turned off after reaching a specific danger threshold temperature during a gradual temperature increase, and when the temperature of the drive coil 21a decreased to a specific operation restoration temperature (70° C.) after a specific period of time had elapsed, the operation of the power relay 21 was restored. However, the present invention is not limited to this.

For example, the operation restoration temperature is not limited to 70° C., and may be a temperature above 70° C., such as 90° C., or a temperature below 70° C.

(E)

In the above embodiment, an example was given in which the temperature of the drive coil 21a was calculated in an electrical circuit including two resistors (second resistors) and in which current at or below the drive current of the power relay 21 is sent through, in order to calculate the temperature of the drive coil 21a that has cooled while the power relay 21 is not operating. However, the present invention is not limited to this.

For example, the number of second resistors for calculating the temperature of the drive coil when the relay is not in operation does not have to be two, and may be one, or may be three or more.

INDUSTRIAL APPLICABILITY

The power cutoff device of the present invention has the effect of improving the function of protecting a power cutoff device including a relay, without having to use a separate temperature sensor or the like to sense the temperature, and as such can be widely applied to various kinds of device including a relay.

REFERENCE SIGNS LIST 1 power cutoff system
10 power cutoff module
11 communication module (transmission device)
11a communication unit
20 power cutoff device
21 power relay (relay)
21a drive coil
21b switching unit
22 data processing unit
22a temperature calculation unit
22b determination unit
22c operation restoration determination unit
23a input
23b output
25 transistor
30 cloud server
31 power transmission network
32 load (electrical device)
40a user terminal
40b administrator terminal
101 power cutoff system
110 power cutoff module
120 power cutoff device
122 data acquisition unit
130 cloud server
130a temperature calculation unit
130b determination unit
130c operation restoration determination unit
$R_x$ resistor (first resistor)
$R_y$, $R_z$ resistors (second resistors)

The invention claimed is:

1. A power cutoff device that monitors a temperature of a relay for cutting off a power supply to an electrical device, and determines whether to cut off the power supply, the power cutoff device comprising:
a relay including a drive coil;
a temperature calculation unit configured to calculate a temperature of the drive coil by calculating a resistance value of a resistor that changes with temperature, when the drive coil included in the relay is regarded as the resistor; and
a determination unit configured to determine whether or not to cut off the power supply on the basis of the temperature of the drive coil calculated by the temperature calculation unit, and
wherein the temperature calculation unit calculates the temperature of the drive coil using a first resistor when the relay is in operation and using a second resistor when the relay is not in operation.

2. The power cutoff device according to claim 1,
wherein the determination unit determines that an abnormality has occurred and determines to cut off the power supply in an event that a temperature increase exceeds a first threshold within a specific length of time.

3. The power cutoff device according to claim 1 or 2,
wherein the determination unit determines that a state is normal and determines not to cut off the power supply in an event that a temperature increase does not exceed a first threshold within a specific length of time.

4. The power cutoff device according to claim 1 or 2,
wherein the determination unit determines that an abnormality has occurred and determines to cut off the power supply in an event that a temperature increase exceeds a second threshold.

5. The power cutoff device according to claim 4,
further comprising an operation restoration determination unit configured to restore an operation of the relay in an event that the temperature is below a third threshold for determining operation restoration after the determination unit has determined that the temperature increase exceeds the second threshold and cuts off the power supply.

6. The power cutoff device according to claim 5,
wherein the operation restoration determination unit determines not to restore the operation of the relay in an event that there is a sudden temperature increase exceeding a first threshold within a specific length of time.

7. A power cutoff device that monitors a temperature of a relay for cutting off a power supply to an electrical device, and determines whether to cut off the power supply, the power cutoff device comprising:
a relay including a drive coil;
a temperature calculation unit configured to calculate a temperature of the drive coil by calculating a resistance value of a resistor that changes with temperature, when the drive coil included in the relay is regarded as the resistor; and
a determination unit configured to determine whether or not to cut off the power supply on the basis of the temperature of the drive coil calculated by the temperature calculation unit, and
a communication unit configured to transmit information about a determination result produced by the determination unit to the outside,
wherein the communication unit changes a destination to which the information about the determination result is transmitted according to the determination result produced by the determination unit.

8. The power cutoff device according to claim 7,
further comprising an operation restoration determination unit configured to restore an operation of the relay in an event that the temperature is below a third threshold for determining operation restoration after the determination unit has determined that a temperature increase exceeds the second threshold and cuts off the power supply,
wherein, when the operation restoration determination unit determines not to restore the operation of the relay, the communication unit transmits information about a cutoff of the power supply to an administrator of the electrical device.

9. The power cutoff device according to claim 7,
further comprising an operation restoration determination unit configured to restore an operation of the relay in an event that the temperature is below a third threshold for determining operation restoration after the determination unit has determined that a temperature increase exceeds the second threshold and cuts off the power supply,
wherein, when the operation restoration determination unit determines to restore the operation of the relay, the communication unit transmits information about a cut-off of the power supply to at least a user of the electrical device.

10. A power cutoff system, comprising:
the power cutoff device according to claim 1 or 2;
a transmission device configured to transmit information about a determination result produced by the determination unit to an outside; and
a cloud server that is connected to a user and an administrator of an electrical equipment via an Internet, and to which information about the determination result is transmitted from the transmission device.

11. A power cutoff system that monitors a temperature of a relay for cutting off a power supply to an electrical device and determines whether to cut off the power supply, the system comprising:
a power cutoff device and a cloud server configured to communicate with the power cutoff device,
wherein the power cutoff device has:
a relay including a drive coil, and
a communication unit configured to communicate with the cloud server, and
the cloud server has:
a temperature calculation unit configured to calculate a temperature of the drive coil by acquiring information about the relay received via the communication unit, and calculating a resistance value of a resistor that changes with temperature, when the drive coil included in the relay is regarded as the resistor, and
a determination unit configured to determine whether or not to cut off the power supply on the basis of the temperature of the drive coil calculated by the temperature calculation unit, and
wherein the temperature calculation unit calculates the temperature of the drive coil using a first resistor when the relay is in operation and using a second resistor when the relay is not in operation.

12. A method for protecting a power cutoff device that monitors a temperature of a relay for cutting off a power supply to an electrical device and determines whether to cut off the power supply, the method comprising:
calculating a temperature of a drive coil included in the relay by calculating a resistance value of a resistor that changes with temperature when the drive coil is regarded as a resistor; and
determining whether or not to cut off the power supply on the basis of the temperature of the drive coil calculated,
wherein in the temperature calculation step, the temperature of the drive coil is calculated using a first resistor when the relay is in operation and using a second resistor when the relay is not in operation.

13. A non-transitory computer-readable recording medium storing a program for protecting a power cutoff device that monitors a temperature of a relay for cutting off a power supply to an electrical device and determines whether to cut off the power supply, the program when read and executed, causing a computer to execute a power cutoff device protection method comprising:
calculating a temperature of a drive coil included in the relay by calculating a resistance value of a resistor that changes with temperature when the drive coil is regarded as a resistor; and
determining whether or not to cut off the power supply on the basis of the temperature of the drive coil calculated,
wherein in the temperature calculation step, the temperature of the drive coil is calculated using a first resistor when the relay is in operation and using a second resistor when the relay is not in operation.

* * * * *